Sept. 2, 1941.　　C. E. FRUDDEN ET AL　　2,254,358
TRACTOR
Filed May 17, 1939　　5 Sheets-Sheet 1
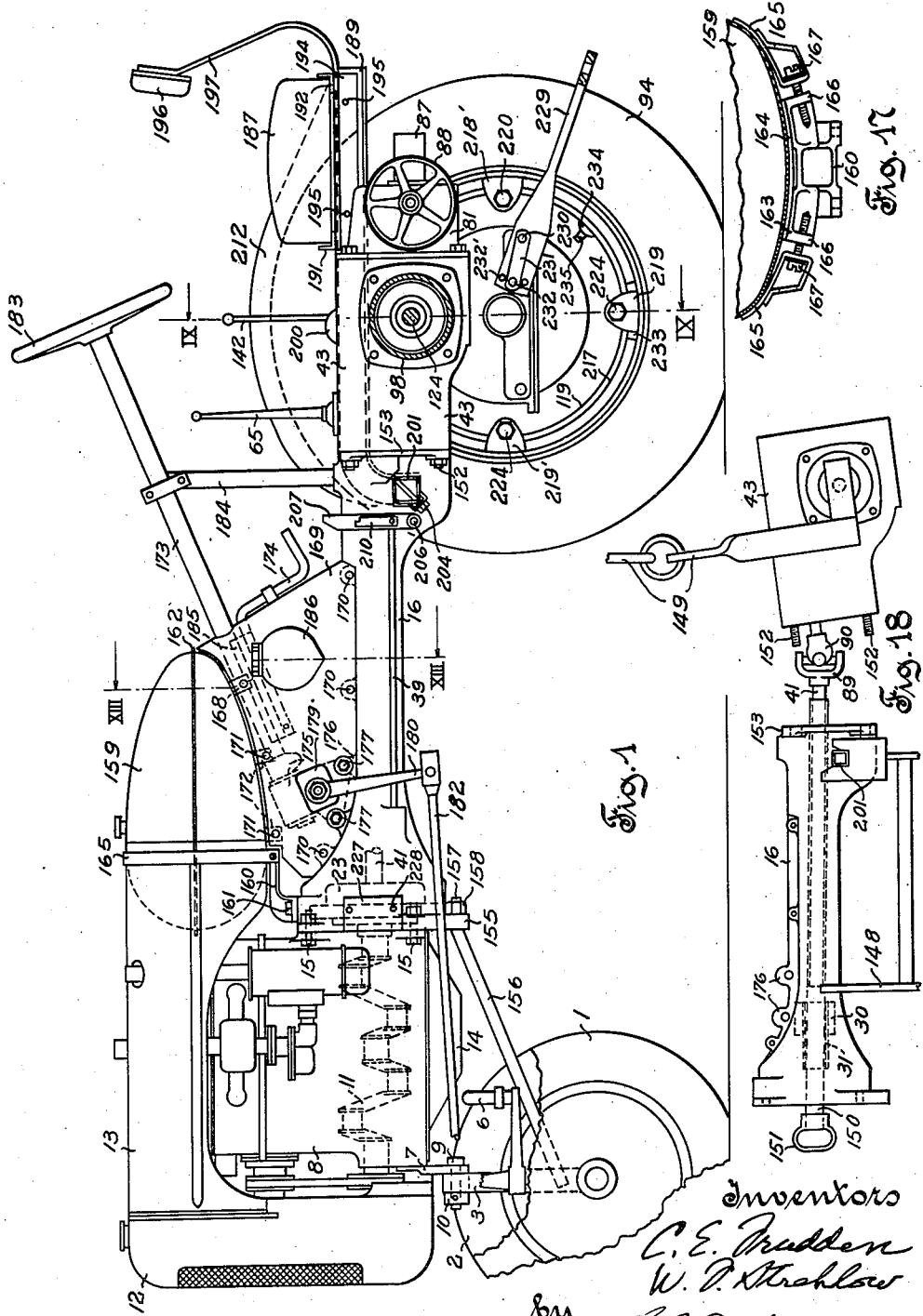
Inventors
C. E. Frudden
W. P. Strehlow
by
Attorney

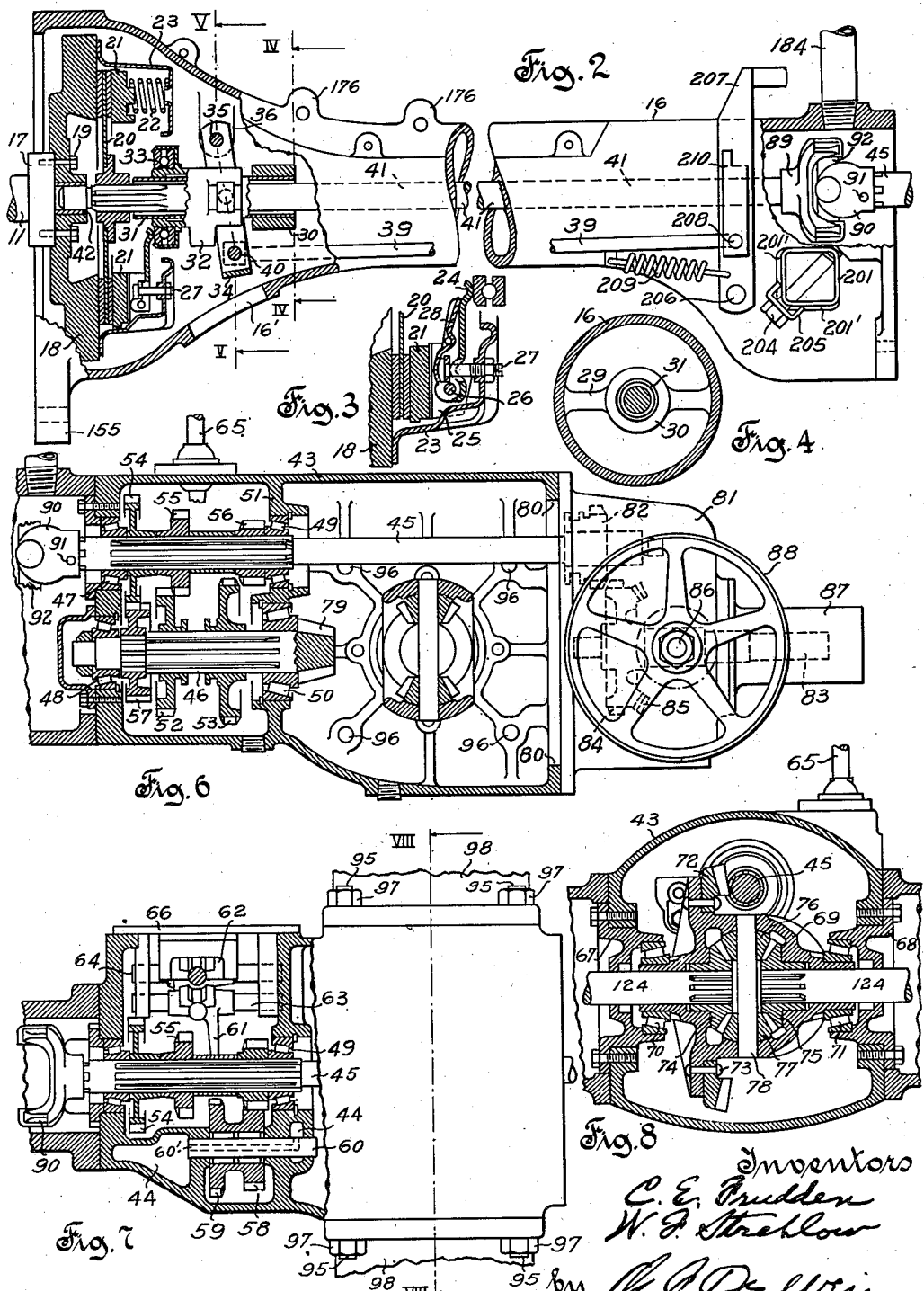

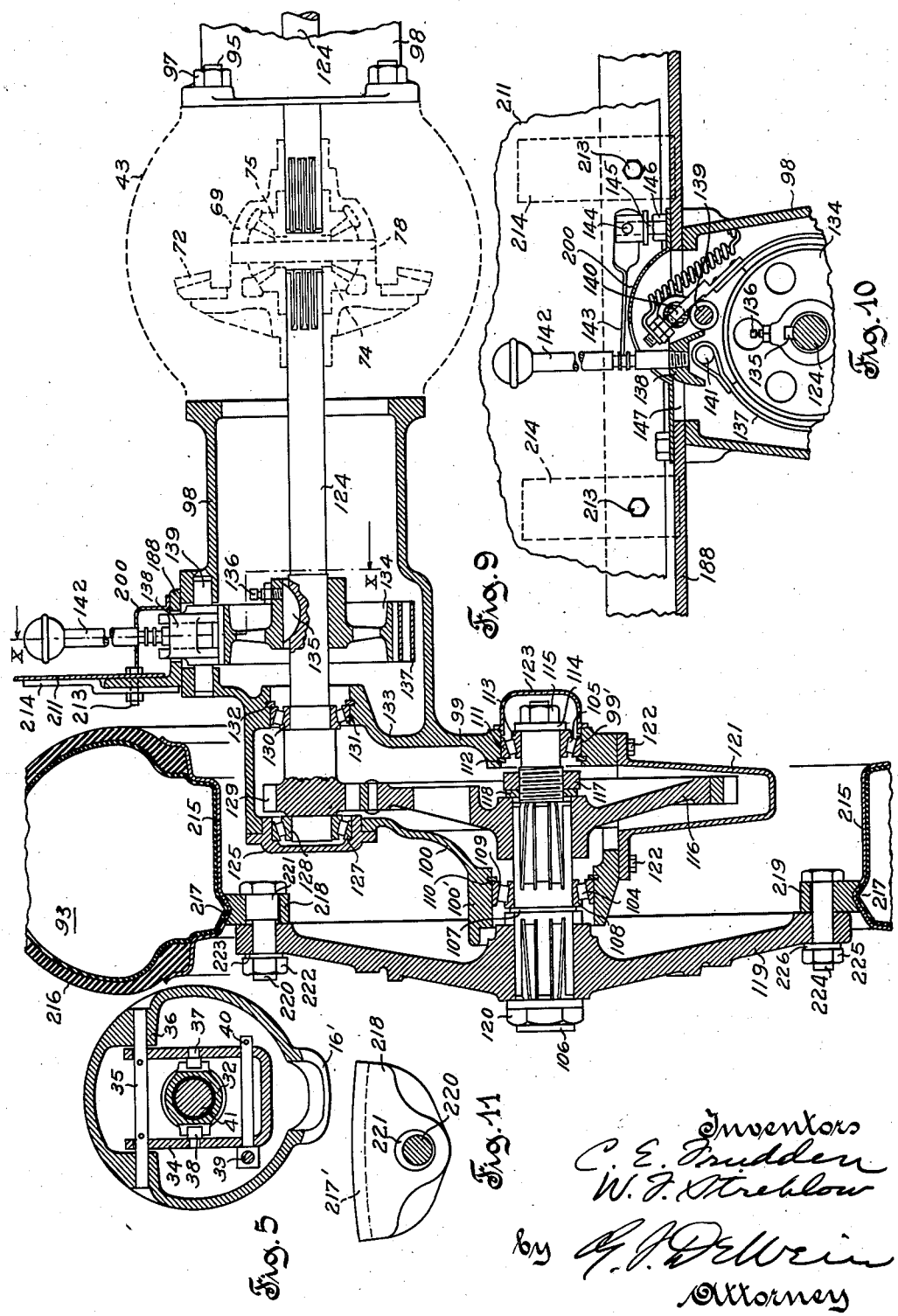

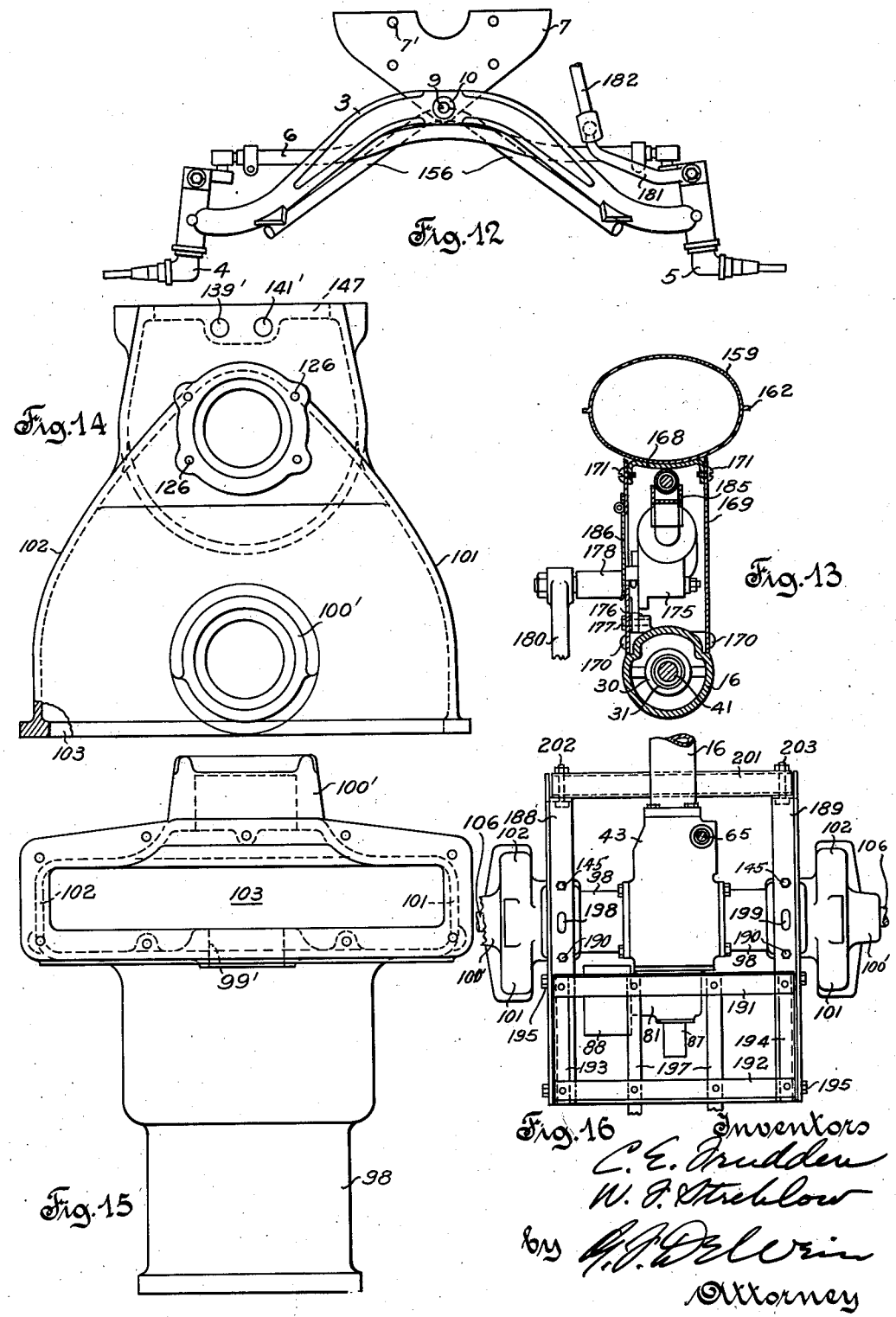

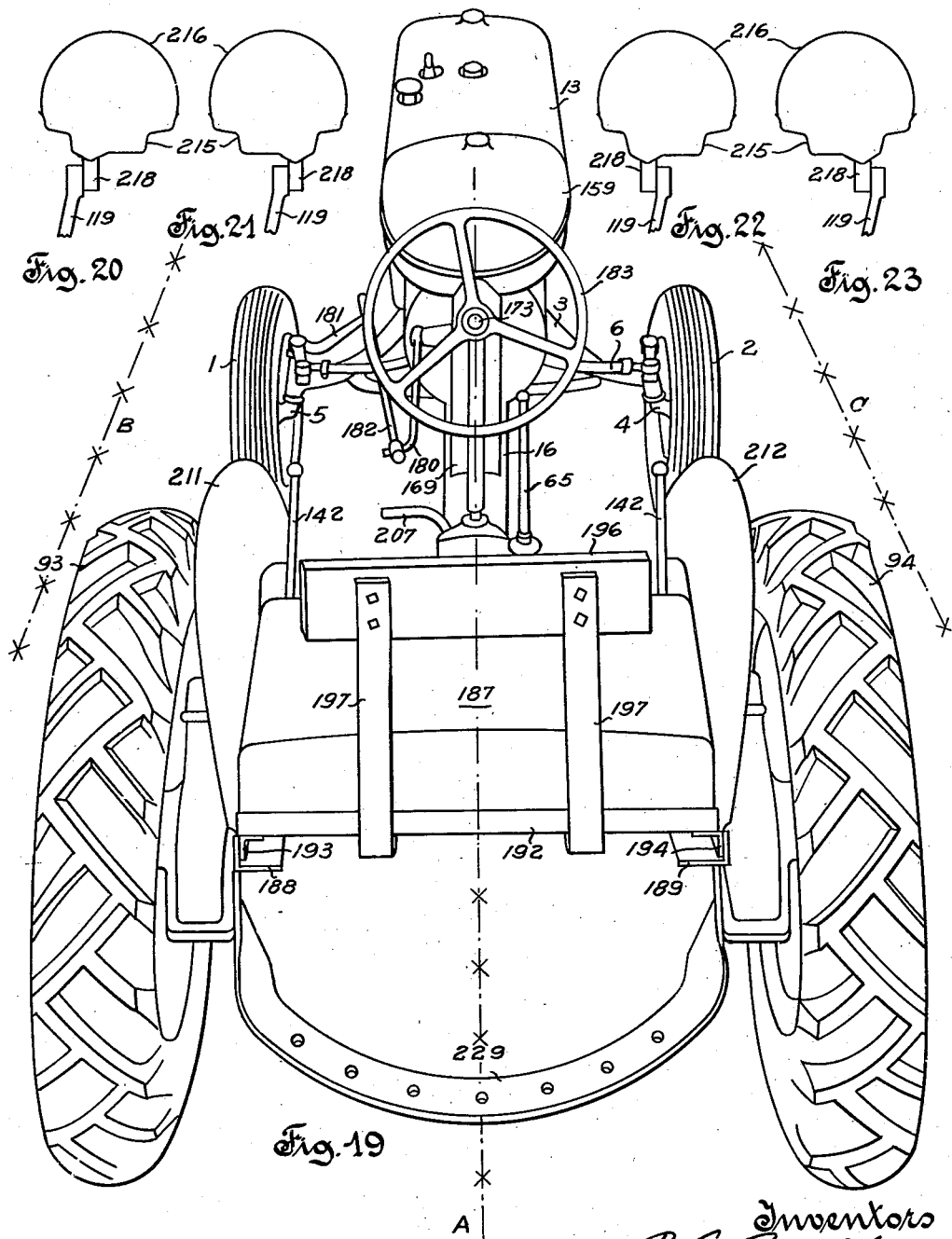

Patented Sept. 2, 1941

2,254,358

UNITED STATES PATENT OFFICE 2,254,358

TRACTOR

Conrad E. Frudden and Walter F. Strehlow, Wauwatosa, Wis., assignors to Allis-Chalmers Manufacturing Company, Milwaukee, Wis., a corporation of Delaware Application May 17, 1939, Serial No. 274,164

29 Claims. (Cl. 180—54)

The invention relates to motor vehicles, and it is concerned more specifically with the construction and arrangment of the vehicular and motive constituents thereof.

In tractors for farm use it has heretofore been common practice to mount the propelling wheels on an upwardly arched rear axle structure and at such axial spacing from each other that they may straddle at least two plant rows when the tractor is being used for row-crop cultivation and similar field operations. This arrangement has been found not only desirable for the purpose of covering a relatively wide ground area in one operation, but also necessary for the reason that the body of the tractor, forwardly of the rear axle structure, had to occupy a position above the space between two relatively adjacent plant rows in order to expose the plant rows at opposite sides of said body to the vision of a driver seated at the rear of the tractor. In tractors of this kind, which are known as "row-crop" tractors, the frame-type as well as the frameless-type of construction have been used. In the frame-type of construction a pair of side channels extend forwardly from the transverse upper part of the arched rear axle structure, and the motor is mounted between forward portions of the side channels; mechanism for transmitting power from the motor to the rear wheels, such as a master clutch and change speed gearing, is mounted between the side channels rearwardly of the motor and forwardly of the rear axle structure. In the frameless-type of construction the motor unit and the clutch and transmission casings are directly connected to form a rigid body which is supported at its rear on the arched axle structure without the use of side channels or other frame members. Both of these types of constructions, as heretofore employed, have made it difficult for the driver to see the ground area directly under the tractor body in advance of the rear axle structure since the motor unit and the intervening structures between the motor unit and the rear axle structure have been such as to make it impossible for the driver to see that ground area from his normal position on the seat, and he had to lean over uncomfortably to one side or the other in order to look under the tractor body in advance of the rear axle structure.

It is an object of the invention to provide an improved row-crop tractor having axially spaced propelling wheels mounted on an arched rear axle structure and a motor unit forwardly of the rear axle structure, the improvement consisting in a novel construction and arrangement of the vehicular and motive constituents of the tractor, so as to afford a better visibility of the ground, forwardly of the rear axle structure, than is afforded by the conventional row-crop tractors referred to hereinbefore. In this connection it is a more specific object of the invention to provide an improved tractor which affords to a driver sitting in a normal and convenient posture on the tractor, a sufficiently broad range of vision so as to include a plant row extending longitudinally of the tractor centrally between the propelling wheels, or more strictly stated, a substantial portion of such plant row immediately forwardly of the rear axle structure. It will be appreciated that a construction which enables the driver to observe a central plant row conveniently from his normal position on the seat and which makes it unnecessary for him to lean over uncomfortably to one side or the other in order to see, at short range, a substantial length of such a plant row, is particularly desirable in a tractor intended for one-row work, and in which the propelling wheels are spaced so as to straddle only one plant row. An especially desirable field of application of the invention may, therefore, be stated as being in one-row tractors, but it is not intended to limit the invention to that field of application since the invention possesses features which may also be used advantageously in multiple-row and other tractors.

A further object of the invention is to provide an improved arched rear axle structure and support for the drive mechanism of the propelling wheels. One of the specific improvements contemplated by the invention in this connection is the provision of two single-piece L-shaped hollow supports secured to opposite sides of an intermediate housing, such as the differential housing. In the improved construction a transverse drive shaft is mounted on a horizontal portion of each L-shaped support, and an axle shaft carrying a driving gear and the propelling wheel at the respective side of the tractor is mounted on a vertical portion of each L-shaped support. The construction is such as to eliminate the usual vertical splits in the final drive casings. The improved construction also includes removable oil pans which are secured to the vertical portions of the L-shaped supports, at each side of the axle structure, and which permit convenient inspection of the gears on the axle shafts.

Still another object of the invention is to provide an improved construction of the intervening drive and supporting structure between the motor and the rear axle structure. In a preferred embodiment of the invention the motor and rear axle structure are detachably secured, respectively, to forward and rearward ends of an intervening tubular member, and the mechanism for transmitting power from the motor to the propelling wheels includes a relatively long propeller shaft within said tubular member, and a driven shaft journaled in angularly fixed position on the rear axle structure. The invention contemplates a flexible driving connection between the propeller shaft and the driven shaft, which permits angular displacement of the propeller shaft relative to the driven shaft within relatively wide limits, so that the tubular member may be assembled with and disassembled from the rear axle structure, or the portion thereof supporting the driven shaft, by telescopic movement of the tubular member over the propeller shaft, without liability of bending the propeller shaft, the latter being connected with the driven shaft prior to the mentioned assembly and remaining connected with the driven shaft during disassembly of the tubular member from the rear axle structure or from the part thereof supporting the driven shaft. The mentioned flexible connection is also desirable because the propeller shaft and driven shaft may not be in perfect alinement after the motor and rear axle structure are secured to the tubular member, considering the need for some play in the detachable connections securing the tubular member to the motor and to the rear axle structure, and in case of such misalinement the flexible connection will prevent binding of the driven shaft in its bearings.

A still further object of the invention is to provide a tractor which is simple and compact in construction, efficient in operation, and which lends itself to mass production at relatively low costs.

These and other objects and advantages of the invention will be apparent from the following description of a preferred embodiment of the invention. Referring to the drawings accompanying and forming part of this specification, and in which like reference characters designate the same or similar parts in the various views:

Fig. 1 is a side view of a one-row tractor, the left rear wheel and part of the rear axle structure at the left side of the tractor being omitted for a better disclosure of the rear part of the tractor;

Fig. 2 is an enlarged side view, partly in section, of a torque tube assembly forming part of the tractor shown in Fig. 1;

Fig. 3 is an enlarged view of part of the clutch mechanism shown in Fig. 2;

Fig. 4 is a section on line IV—IV of Fig. 2;

Fig. 5 is a section on line V—V of Fig. 2;

Fig. 6 is an enlarged view of a transmission and power takeoff assembly forming part of the tractor shown in Fig. 1, the transmission assembly being shown in section on a vertical plane extending centrally and longitudinally of the tractor;

Fig. 7 is a top view, partly in section, of the assembly shown in Fig. 6, the power takeoff mechanism being omitted in this view;

Fig. 8 is a section on line VIII—VIII of Fig. 7;

Fig. 9 is a vertical section, on an enlarged scale, through part of the rear axle structure of the tractor shown in Fig. 1, the section being taken on line IX—IX of Fig. 1 and showing parts omitted in Fig. 1;

Fig. 10 is a view on line X—X of Fig. 9;

Fig. 11 is a side view of a rim clamp;

Fig. 12 is a front view of the front axle structure of the tractor shown in Fig. 1;

Fig. 13 is an enlarged section on line XIII—XIII of Fig. 1;

Figs. 14 and 15 are enlarged detail views of an L-shaped support forming part of the rear axle structure of the tractor shown in Fig. 1, Fig. 14 being a view looking at the support from the side of the tractor, and Fig. 15 being a bottom view;

Fig. 16 is a top view of the rear end of the tractor shown in Fig. 1, the propelling wheels, seat cushion, seat back and fenders being omitted in Fig. 16;

Fig. 17 is a rear view of a fuel tank bracket shown in Fig. 1;

Fig. 18 is a schematic view illustrating a step in the assembly of the tractor shown in Fig. 1;

Fig. 19 is a perspective rear view of the tractor shown in Fig. 1, the view being taken from a point rearwardly and above the tractor; and Figs. 20 to 23, inclusive, are detail views showing different wheel adjustments.

Referring to Figs. 1, 12 and 19, the tractor shown is of the "frameless" type and has axially spaced front wheels 1 and 2 which are mounted on opposite ends of an upwardly arched front axle 3 by means of steering knuckles 4 and 5, respectively. Upper arms of the steering kunckles are connected by a tie rod 6 which is also arched upwardly so as to leave the ground clearance afforded by the upwardly arched front axle 3 substantially unobstructed. A plate 7 is secured to the forward end of a motor block 8 by bolts extending through bolt holes 7', and a pivot pin 9 secured to the plate 7 extends through the upper transverse portion of the front axle 3, permitting transverse rocking movement of the front axle relative to the motor unit. A collar 10 secured to the pin 9 retains the front axle 3 against axial displacement on the pin 9. The motor block 8 forms part of an internal combustion engine which is of generally conventional design and therefore requires no detailed description, the crank shaft 11 of the engine being indicated in dotted lines in Fig. 1. A radiator and shell 12 are supportingly connected with the motor block by a suitable bracket stucture (not shown), and a hood 13 is supported at its forward end on the radiator sheell 12. A bottom opening of the motor block 8 is closed by an oil pan 14. It will be noted that the wheeled front axle cooperates with a forward portion of the engine and with the ground to support the engine unit of the tractor.

Secured to the rear end of the motor block 8 by means of bolts 15 is a torque tube casing 16 which is shown more clearly in Fig. 2. The torque tube casing 16 has a circumferential wall which forms a rearwardly tapering bell housing immediately adjacent to the engine and a rearward tubular extension of the reduced end of the bell housing, the tubular extension of the bell housing being of substantial length longitudinally of the tractor and of relatively short width transversely of the tractor, as may be seen from Figs. 1, 13, 16, and 19. The bell shaped or flared forward portion of the torque tube casing extends over a flywheel and clutch assembly at the rear of the motor block 8, as best shown in Fig. 2. The crank shaft 11 has a flange 17 to which a flywheel 18 is secured by means of bolts 19. The driven member of the clutch mechanism consists, as usual, of a friction disk 20, and a pressure ring 21 cooperates with the disk and a series of coil springs 22 to press the disk into contact with the rear face of the flywheel 18. The coil springs 22 bear at their rear ends upon a shell member 23 which is secured to the flywheel 18 and also furnishes a support for a suitable clutch actuating mechanism, details of which are shown more clearly in Fig. 3. This mechanism is of the type generally used in automotive design and includes three clutch actuating arms 24 which are mounted 120 degrees apart on rearwardly extending lugs 25 of the pressure ring 21 by means of pivot pins 26. The arms 24 have rocking contact with adjustable studs 27 which are mounted on the shell 23, suitable springs 28 being provided to urge the arms rearwardly about their pivot connections 26.

Integrally formed with the torque tube casing 16 is an internal cross member 29 which is more clearly shown in Fig. 4 and has a central hub portion 30 coaxial with the longitudinal axis of the torque tube casing 16. Press-fitted into a bore of the hub 30 is a tube 31 which serves as a support for the shifting collar of the clutch mechanism, the collar comprising a sleeve 32 and a thrust ring 33 which is rotatably mounted on the sleeve by means of series of balls, the ring 33 engaging the inner ends of the clutch actuating arms 24. The shift mechanism for the shifting collar comprises a bail 34 which, as shown in Fig. 5, is pivoted on a transverse pin 35 mounted in internal lugs 36 of the torque tube casing 16. The arms of the bail 34 are connected with the sleeve 32 by means of studs 37 carrying rollers 38 within vertical slots at opposite sides of the sleeve 32. An operating rod 39 for the clutch is secured at its forward end to a pin 40 mounted on the lower end of the bail 34. As shown in Figs. 2 and 5, the bell housing which forms the forward part of the torque tube casing 16 has a bottom opening 16' below the shifting collar and actuating bail 34, the bottom opening 16' affording access to these and other parts of the clutch mechanism for service purposes, such as greasing and adjusting.

Forward movement of the clutch actuating rod 39 will cause forward shifting movement of the sleeve 32 on the tube 31 and corresponding rocking movement of the clutch actuating arms 24 on the shell 23. As a result of such rocking movement of the arms 24 the pressure ring 21 will be moved rearwardly against the pressure of the coil springs 22 and the frictional engagement between the flywheel 18 and the friction disk 20 will be released so that the flywheel may rotate independently of the disk 20.

A propeller shaft 41 is piloted at its forward end in a bushing 42 of the flywheel 18 and has a splined portion rearwardly of its pilot journal which extends through the internally splined hub of the friction disk 20, the splines on the propeller shaft 41 cooperating with the internal splines of the hub of the friction disk to secure the disk non-rotatably to the shaft but permitting ready withdrawal of the propeller shaft from the hub. It should also be noted that the diameter of the portion of the propeller shaft extending through the tube 31 is somewhat smaller than the internal diameter of the sleeve 31 so that the propeller shaft will have no bearing contact with the tube 31 and will be supported at its forward end solely within the bushing 42 of the flywheel 18.

A transmission and differential casing 43 is bolted to the rear end of the torque tube 16, the transmission and differential casing and its enclosed mechanism being more clearly shown in Figs. 6 to 8, inclusive. The forward portion of the casing 43 has a vertical front wall in which a drive shaft 45 and a driven shaft 46 are mounted by means of roller bearings 47 and 48, respectively. The shafts 45 and 46 are supported rearwardly of the roller bearings 47 and 48 in roller bearings 49 and 50, respectively, these latter roller bearings being mounted in an internal transverse wall 51 of the casing 43. The driven shaft 46 forms the variable speed shaft of a change speed mechanism enclosed within the forward portion of the housing 43, this mechanism being of the shiftable gear type and including shifting gears 52 and 53 on the driven shaft 46 and non-shiftable gears 54, 55 and 56 on the drive shaft 45. For first speed forward the shiftable gear 53 is moved into mesh with the low speed pinion 56 on the drive shaft. For second speed forward the shiftable gear 52 is moved into mesh with the second speed gear 55 on the drive shaft 45, and for third or high speed forward the shiftable gear 52 is axially shifted into clutching engagement with an idler gear 57 on the driven shaft 46. The idler gear 57, which is rotatably mounted on the forward portion of the driven shaft 46, is in constant mesh with the gear 54 on the drive shaft. The casing 43 is filled with lubricant to a level below the roller bearings 47 and 49, and in operation the idler gear 57 will function as a lubricant raising gear to convey a limited amount of lubricant to the roller bearing 47. The low speed pinion 56 is in constant mesh with a reverse idler 58 shown in Fig. 7, the reverse idler being integrally formed with a countergear 59, and the gears 58 and 59 are rotatably mounted on a shaft 60 mounted on internal wall portions of the transmission casing 43. A longitudinal bore 60' in the shaft 60 communicates with pockets 44 and 44' of the casing 43, the pocket 44 receiving lubricant raised by the gear 54, and the pocket 44' having a suitable outlet, not shown, to admit lubricant to the rearward roller bearing 49. For reverse drive the gear 53 is shifted into mesh with the countergear 59 which will rotate the driven shaft 46 in a direction opposite to that in which said shaft is rotated by engagement of the gears 52 and 53 with the gears 55 and 56, respectively. The shifting mechanism for the gears 52 and 53 includes shifting forks 61 and 62 indicated in Fig. 7 which are slidably mounted on shafts 63 and 64, respectively. A universally movable gear shift lever 65 is mounted on the top wall of the casing 43 and selectively engageable with the shifting forks 61 and 62 in the usual manner. The casing 43 has a side opening closed by cover 66 indicated in Fig. 7 for the purpose of insertion and removal of the gears.

The rearward portion of the transmission and differential casing 43 has side openings in which bearing retainers 67 and 68 are mounted as shown in Fig. 8. A differential cage 69 has opposite journal portions which are mounted in the bearing retainers 67 and 68 by means of roller bearings 70 and 71, and a beveled ring gear 72 is secured to a radial flange of the differential cage 69 by means of rivets 73. Internally splined differential bevel pinions 74 and 75 are rotatably mounted on the differential cage 69, the pinions 74 and 75 having tubular hub extensions which are rotatably fitted into counterbores of the differential cage 69. Another pair of differential bevel pinions 76 and 77 cooperating with the differential pinions 74 and 75 are mounted on a pinion shaft 78 which is secured at its opposite ends within the differential cage 69. The ring gear 72 meshes with a beveled pinion 79 which is integrally formed with the driven shaft 46 at the rear end of the latter.

The transmission and differential casing 43 has a large rearward opening 80 which, as shown in Fig. 6, is covered by a cap housing 81 enclosing power takeoff mechanism. The drive shaft 45 extends rearwardly through the portion of the casing 43 enclosing the differential mechanism and projects into the cap housing 81, the rear end of the drive shaft 45 being journaled in a bearing of the cap housing, not shown. A power takeoff shaft 83 is mounted in the cap housing 81 and carries a combined spur and bevel gear 84, 85, the bevel gear portion 85 of the combined gear meshing with a bevel gear on a belt pulley shaft 86. Slidably mounted on a splined portion of the drive shaft 45 is a pinion 82 adapted to be shifted into and out of mesh with the spur gear portion 84 of the combined gear 84, 85, engagement and disengagement of the gears 82 and 84 drivingly connecting and disconnecting the drive shaft 45 with the power takeoff shaft 83 and with the belt pulley shaft 86. A protecting sleeve 87 for the end of the power takeoff shaft projecting from the cap housing 81 is detachably secured to the rear wall of the cap housing 81 and may be removed if it is desired to connect the power takeoff shaft with any driven machinery. A belt pulley 88 is secured to the outer end of the belt pulley shaft 86 as shown in Figs. 1 and 16. Features of the power takeoff mechanism herein disclosed but not claimed are claimed in a copending application of C. E. Frudden, Serial No. 274,519, filed May 19, 1939, for Power take-off.

The forward end of the drive shaft 45 projects forwardly from the transmission and differential casing 43 into the torque tube casing 16, and the rear end of the propeller shaft 41 is drivingly connected with the forward end of the drive shaft 45 by means of a universal joint as shown in Fig. 2. The joint comprises a forked driving member 89 which is suitably secured to the rear end of the propeller shaft 41, preferably by welding, and a driven member 90 which is non-rotatably secured to the drive shaft 45, the hub of the driven member 90 being internally splined and fitted upon the splined forward portion of the drive shaft 45 and retained thereon against axial displacement by a pin 91. The driving and driven members 89 and 90 of the universal joint are connected, respectively, to an intermediate cross member 92 as is usual in universal joints of the type here shown and which are known as gimbal joints. It will be seen that the rear end of the propeller shaft 41 is supported on the drive shaft 45 by means of the universal joint, and that the joint will prevent binding of the drive shaft 45 in its bearings 47 and 49 if, upon assembly of the motor block 8, torque tube casing 16 and transmission and differential casing 43, the drive shaft 45 and crank shaft 11 should not be in perfect alinement.

The transmission and differential casing 43 forms part of an upwardly arched rear axle structure for the rear wheels 93 and 94 of the tractor. Referring to Figs. 9 and 16, the casing 43 is positioned between two L-shaped supports, one of which is an exact duplicate of the other, and a detailed description of one of these supports will therefore be sufficient. Studs 95 are mounted in threaded holes 96 (Fig. 6) of the casing 43 and extend through flange portions of the respective L-shaped support, nuts 97 on the studs securing the L-shaped support in fixed position on the casing 43. The upper transverse portion of the L-shaped support forms a tubular housing 98 as shown in Fig. 15, and at the outer end of the tubular housing a final drive casing is formed by wall portions 99 and 100 integrally formed with and depending from the tubular portion 98. The wall portions 99 and 100 are integrally connected by transverse wall portions 101, 102 which merge with the tubular portion 98, and an oblong opening 103 is formed at the bottom of the final drive casing between the side walls 99 and 100 and the end walls 101, 102. The outer side wall 100 of the final drive casing has a bearing boss 100' above the bottom opening 103, and the inner side wall 99 of the final drive casing has a bearing opening 99' as best shown in Fig. 9. Rotatably mounted within the bearing boss 100' and the bearing opening 99' by means of inner and outer roller bearings 105, 104 is an axle shaft 106. The outer roller bearing has an inner race 108 which is seated against a spring ring 107 on the axle shaft 106, and an outer race 109 seated against a spring ring 110 in the bearing boss 100'. The inner roller bearing has an outer race 111 seated against a spring ring 112 in the bearing opening 99', and an inner race 113 seated against a washer 114 which is drawn up against the inner race 113 by a nut 115 on the inner end of the axle shaft 106. The nut 115 is adjusted so as to afford free running of the axle shaft in the roller bearings while retaining the axle shaft against axial displacement. Mounted on a splined portion of the axle shaft 106 within the final drive casing is a final drive gear 116, the gear having a splined hub which engages tapered splines of the axle shaft, and a nut 117 on a threaded portion of the axle shaft 106 bears against a washer 118 to secure the gear 116 on the axle shaft 106 against axial displacement. A wheel body 119 is mounted on the portion of the axle shaft extending outwardly from the outer wall bearing, the wheel body 119 having an internally splined hub seated on a tapered splined portion of the axle shaft and retained in position by a nut 120. The gear wheel 116 projects downwardly through the opening 103 of the final drive casing, and an oil pan 121 is secured to the lower end of the final drive casing by bolts 122 to enclose the downwardly projecting portion of the gear wheel 116. The length of the opening 103 transversely of the axle shaft 106 is somewhat larger than the diameter of the gear 116, and the width of the opening 103 is somewhat wider than the total axial width of the gear wheel 116. A cap 123 is inserted into the bearing opening 99' to seal that opening, and a suitable seal (not shown) is mounted in the bearing boss 100' to seal the space between the axle shaft 106 and the bearing boss 100'.

A transverse drive shaft 124 extends through the tubular portion 98 of the L-shaped support and has a splined inner end telescopically engaging the internally splined hub of the differential bevel pinion 74. The outer end of the transverse shaft 124 is mounted in inner and outer roller bearings at the outer end of the tubular housing 98. The outer bearing for the drive shaft 124 comprises an outer race 127 which is fitted into a cap 125 within a side aperture of the final drive casing, the cap 125 being held in place by four bolts threaded into openings 126 of the L-shaped support shown in Fig. 14. The inner race 128 of the outer bearing for the drive shaft 124 is seated against a pinion 129 integrally formed with the drive shaft and meshing with the final drive gear 116. The inner bearing for the drive shaft 124 comprises an inner race 130 seated against a shoulder on the shaft 124 and an outer race 131 seated against a spring ring 132 within a partition 133 of the L-shaped support. A suitable oil seal (not shown) surrounds the shaft 124 within the bore of the partition 133 in which the inner roller bearing for the drive shaft 124 is mounted. A brake drum 134 within the tubular portion 98 of the L-shaped support is mounted on the drive shaft 124, a key 135 securing the brake drum against rotation on the shaft 124 and a set screw 136 securing the brake drum against axial displacement on the shaft 124. A brake band 137 shown in Fig. 10 encircles the brake drum and suitable mechanism for tightening and loosening the brake band is mounted within an opening 147 (Fig. 14) of the tubular portion 98 of the L-shaped support. The mechanism for tightening the brake band 137 includes a lever 138 which is pivoted on a pin 139 and which is adjustably connected with one end of the brake band at 140, the other end of the brake band being anchored on a pin 141. As shown in Fig. 14, a pair of holes 139' and 141' are drilled into an upper portion of the L-shaped support, and at the left side of the tractor the pins 139 and 141 are mounted, respectively, in the holes 139' and 141'; at the right side of the tractor the pin 139 is mounted in the hole 141' and the pin 141 is mounted in the hole 139', and the assembly of the brake mechanism is correspondingly reversed so that in operation each brake lever will have to be pulled to the rear in order to tighten the brake band. Secured to the lever 138 is a handle 142 which may be locked in tightened position by a latch 143 pivoted at 144 on a stud 145. The stud 145 is screwed into the L-shaped support and has a nut 146 for a purpose to be explained later.

The L-shaped support comprising the tubular portion 98 and the final drive casing is a single piece structure, preferably in the form of a casting, and affords a desirably rigid support for mounting the propelling wheel thereon. The propelling wheel 93 is supportingly connected, by the L-shaped support at the left isde of the tractor, with the gear casing 43 in laterally offset relation to the long and narrow tubular portion of the torque tube casing 16, and the propelling wheel 94 is similarly positioned in laterally offset relation to the long and narrow tubular portion of the torque tube casing 16 by the L-shaped support at the right side of the tractor. The oil pan 121 is readily removable for inspection of the final drive gear 116, and the mounting of the axle shaft 106 and the drive shaft 124 described hereinbefore permits a convenient assembly and disassembly of the drive mechanism. In order to remove the final drive gear 116 from the L-shaped support the oil pan 121 is first removed, whereupon the nut 117 becomes accessible through the opening 103 of the final drive casing. Removal of the cap 123 will expose the nut 115, and by unscrewing the nuts 117 and 115, the axle shaft 106 will be liberated for axial withdrawal from the inner and outer roller bearings and from the final drive gear 116. After withdrawal of the axle shaft 106 the final drive gear 116 may be moved transversely of the drive shaft 124 through the bottom opening 103 of the final drive casing. In order to remove the drive shaft 124 from the L-shaped support, the cap 125 is first withdrawn, whereupon the shaft may be moved axially in an outward direction, the opening for the cap being large enough to permit passage of the pinion 129 therethrough. The lever 138 of the brake mechanism is detached from the brake band and removed from the opening 147 above the brake drum, and after movement of the drive shaft 124 in an outward direction the set screw 136 will become accessible through the opening 147 from which the brake lever 138 has been removed. After loosening of the set screw 136 the shaft 124 may then be entirely withdrawn from the L-shaped support, the brake drum 134 remaining within the tubular section 98.

The torque tube casing 16, as stated, has a bell shaped forward portion which extends over the clutch mechanism, and a comparatively long and narrow tubular part between the forward motor unit and the arched rear axle structure. In the manufacture of the tractor the transmission and differential mechanisms are assembled within the casing 43 prior to the attachment of the L-shaped rear wheel supports thereto, and the propeller shaft is connected with the forward end of the drive shaft 45 of the transmission prior to the assembly of the torque tube casing 16 with the transmission casing 43. At the starting end of the assembly line the torque tube casing 16 is placed on a truck 148 (Fig. 18), and the casing 43 with the propeller shaft 41 connected to the shaft 45 by the universal joint 89 and 90 is moved to the place of assembly by a traveling hoist, parts of which are indicated at 149 in Fig. 18. A temporary guide tube 150 with a handle 151 is inserted into the torque tube casing 16 through the tube 31 mounted in the central hub portion 30 of the torque tube casing 16. The temporary guide tube 150 is of slightly smaller diameter than the inside diameter of the tube 31, and after insertion into the torque tube 16 it assumes a position approximately as shown in Fig. 18. The propeller shaft 41 is picked up by a workman and inserted into the open rear end of the temporary guide tube whereupon the casing 43 may be manipulated into position for attachment to the torque tube casing 16, studs 152 projecting from the casing 43 being moved into openings of a flange portion 153 at the rear end of the torque tube casing 16. During such manipulation of the casing 43 the propeller shaft 41 slides into the temporary guide tube 150, and due to the provision of the universal joint 89 and 90 the casing may be conveniently manipulated without liability of bending the propeller shaft 41. After the studs 152 have entered the flange portion 153 of the torque tube casing 16, nuts are tightened upon the studs 152 to hold the torque tube casing 16 and the transmission and differential casing 43 securely together. Thereafter the temporary guide tube 150 is withdrawn, and the propeller shaft 41 will then rest on the tube 31 in approximate alinement with the drive shaft 45 of the transmission. The truck 148 is then moved to another station of the assembly line where the motor unit will be connected with the forward end of the torque tube casing 16. The flywheel 18 and the clutch disk 20 together with the shell 23, pressure ring 21, springs 22 and the clutch actuating arms 24 and the associated parts are mounted on the motor unit prior to its assembly with the torque tube casing 16, and the shifting collar 32, 33, shifting bail 34 and associated parts are mounted on the torque tube casing 16 prior to such assembly. In bringing the motor unit and the torque tube casing together it is therefore merely necessary to telescopically engage the forward end of the propeller shaft with the hub of the clutch disk 20 and with the pilot bushing 42 of the flywheel 18. Since the propeller shaft 41 is already held in an approximately correct position within the torque tube casing 16, the telescopic engagement of the forward parts of the propeller shaft with the corresponding parts of the motor unit may be effected without difficulty, and after the motor unit and the torque tube casing 16 have been brought into their proper relative positions, the bolts 15 are installed to secure the motor unit and the torque tube casing 16 together.

On the other hand, if the tractor is disassembled by removing the engine unit from the forward end of the torque tube casing 16, the pilot journal at the forward end of the propeller shaft 41 will slide out of the bushing 42 at the rear end of the motor crankshaft 11 while the splined forward portion of the propeller shaft slides out of the splined bore of the hub of the clutch disk 20. After the engine unit has been moved axially away from the torque tube casing 16 far enough to liberate the splined forward portion of the propeller shaft from the splined hub of the clutch disk, the propeller shaft will tend to drop about the center of the universal joint at its rear end, but when the propeller shaft starts to drop it is almost immediately intercepted by the tube 31 which will hold it approximately centered within the torque tube casing 16 and in approximate axial alinement with the transmission shaft 45.

In the assembled tractor, the torque tube casing 16, together with its forward and rearward connections, respectively, with the motor block 8 and with the transmission casing 43, serves as the sole means for retaining the engine unit and rear axle structure in fixed position relative to each other not only against relative horizontal and vertical displacements but also against relative torsional displacement about the axis of the torque tube casing 16. The forward connection including the bolts 15, between the torque tube casing 16 and the motor block 8, the rearward connection including the studs 152, between the torque tube casing 16 and the transmission casing 43, and the torque tube casing 16 itself are sufficiently strong to retain the engine unit and rear axle structure in desired fixed position relative to each other under all operating conditions, including those which subject the mentioned parts to heavy twisting forces, about the axis of the torque tube casing, for instance, when the tractor is traveling over uneven ground, or when it is pulling a heavy load and the engine develops a corresponding torsional reaction about the axis of the crankshaft 11, which reaction is transmitted to the rear axle structure through the torque tube casing 16.

Another step in the assembly of the tractor is the mounting of the L-shaped supports on the rear end of the casing 43, the shaft 124, axle shaft 106, final drive gears 116 and 129, and associated parts being mounted on the L-shaped supports prior to the assembly of the L-shaped supports with the casing 43. In making such assembly it is merely necessary to move the drive shafts 124 through the bearing retainers 67 and 68 into engagement with the differential pinions 74 and 75, and then to secure the L-shaped supports to the casing 43 by means of the studs 95 and nuts 97.

Another step in the assembly of the tractor is the mounting of the front axle 3 on the pin 9 of plate 7, and connecting the front axle 3 with a downwardly projecting lug 155 of the torque tube casing by means of a thrust fork 156. The thrust fork is secured at its open forward end to the front axle 3 as shown in Fig. 12, prior to the installation of the axle 3 on the pin 9, and the lug 155 of the torque tube casing 16 receives a rearwardly extending journal pin 157 of the thrust fork, the journal pin 157 extending on the same horizontal axis as the pivot pin 9. A nut 158 on the journal pin secures the thrust fork 156 against axial displacement relative to the lug 155.

Referring again to Fig. 1, a fuel tank 159 is mounted on a bracket 160 which is bolted on top of the bell housing of the torque tube casing 16 by means of bolts 161. The fuel tank has a shape somewhat similar to that of an egg, but its upper and lower halves which are joined together by a horizontal seam 162 are flattened so that any cross-section in a vertical plane transversely of the tractor will be more or less elliptical as may be seen from Fig. 13. A forward portion of the tank 159 overlying the bracket 160 projects under the hood 13, and the portion of the tank overhanging the bracket 160 at the rear tapers rearwardly and is vertically spaced from the bell housing and from the adjoining tubular portion of the torque tube casing 16.

The bracket 160 has a rearward portion 163 of substantial width transversely of the tractor as shown in Fig. 17, and of comparatively short length longitudinally of the tractor, the portion 163 affording a raised seat for the fuel tank near its center of gravity. A strip of fabric 164 is interposed between the seat 163 and the bottom of the fuel tank 159, and a metal strap 165 embracing the rear end of the hood 13 and the fuel tank 159 is secured to downwardly projecting lugs 166 of the bracket 160 by screws 167 and properly tightened to hold the fuel tank 159 in position on the bracket 160.

A sheet metal clip 168 is welded to the bottom of the fuel tank a substantial distance rearwardly of the bracket 160, and a sheet metal support 169 secured to the torque tube casing 16 by means of screws 170 is connected with the clip 168 by screws 171. The support 169 comprises transversely spaced side walls and a rearwardly curved transverse wall connecting the side walls at the rear of the support, a suitable blank cut from sheet metal stock and bent into U-shape being preferably used to form the side walls and the rear wall in one piece. The side walls of the support 169 are transversely spaced from each other a distance slightly less than the external diameter of the tubular portion of the torque tube 16 and extend upwardly from the torque tube casing 16 parallel to a vertical plane through the axis of the torque tube casing 16. The upper edges of the side walls of the support 169 conform substantially with the configuration of the fuel tank, but the bottom of the fuel tank is kept slightly spaced from said upper edges by the clip 168. Additional clips 172 are mounted between the side walls of the support 169 to hold the upper portions of the side walls properly spaced from each other. The curved rear wall of the support 169 has an opening for the reception of a steering column 173, the opening being large enough to also permit insertion of a starting crank 174 which may be carried on the tractor as shown in Fig. 1 when it is not used for starting.

Mounted on the torque tube casing 16 between the side walls of the support 169 is a steering gear casing 175, the casing 16 having upwardly projecting lugs 176 to which the steering gear casing 175 is secured by means of bolts 177, the heads of these bolts projecting through suitable apertures in the left side wall of the support 169. The steering gear casing 175 has a side arm 178, shown in Fig. 13, which extends through a square opening 179 in the left side wall of the support 169, and a steering arm 180 is secured to a shaft on the side arm 178. The steering arm 180 is connected with an arm 181 of the left steering knuckle 5 as shown in Fig. 19 by a reach rod 182, and the tractor may be steered by manipulation of the hand wheel 183 at the rear end of the steering column 173, the hand wheel being connected with suitable worm and gear mechanism within the steering gear casing 175. The steering column is supported rearwardly of the steering gear casing 175 on a post 184 which is screwed into an opening at the rear of the torque tube casing 16.

A channel 185 is welded to the steering column 173 within the space between the side walls of the support 169, the channel 185 serving to hold the starting crank 174 in the position in which it is shown in Fig. 1. The steering gear casing 175 occupies most of the space between the side walls of the support 169 at the forward end of the latter and a space for the reception of tools or other accessories is available rearwardly of the steering gear casing 175 between the side walls of the support 169 and its curved rear wall connecting the side walls. This space is substantially closed at the bottom by the torque tube casing 16 and at the top by the bottom of the fuel tank 159, and is accessible through a hole in the left side wall of the support 169, the hole being covered by a hinged lid 186. It will be seen that the sheet metal support 169 not only sustains the fuel tank 159 rearwardly of the bracket 160, but also furnishes a receptacle for tools or other accessories. Features of the fuel tank arrangement herein disclosed are claimed in a copending application of Conrad E. Frudden and Walter F. Strehlow, Serial No. 320,105, filed February 21, 1940, for Fuel tank mounting for tractors.

The driver's seat at the rear of the tractor comprises a relatively wide cushion 187 which is mounted between angle iron beams 188 and 189 secured to the L-shaped supports at opposite sides of the casing 43 as best shown in Figs. 1 and 16. The seat cushion 187 rests on a framework comprising transverse angle bars 191 and 192 connected at their ends by longitudinal angle bars 193 and 194, the framework fitting between vertically disposed flanges of the beams 188 and 189, and being held in place by bolts 195. A back rest 196 is secured to spring arms 187 which are secured to the transverse angle bars 191 and 192 of the seat frame. The beams 188 and 189 have oblong apertures 198 and 199 to permit back and forth movement of the brake levers 142 which pass through the apertures 198 and 199, and slotted caps 200 are mounted over these apertures as more clearly shown in Fig. 10. The studs 145 carrying the latches 143 which have been mentioned hereinbefore pass through the caps 200 and through the beams 188 and 189, and the nuts 146 of the studs 145 are tightened to hold the caps 200 and the horizontal flanges of the beams 188 and 189 in position on the L-shaped supports. Bolts 190 rearwardly of the studs 145 similarly extend through the caps 200 and through the horizontal flanges of the angle iron beams 188 and 189, and are properly tightened to secure the caps and beams in position.

The forward ends of the beams 188 and 189 are curved downwardly as indicated in Fig. 1, and a transverse tubular beam 201 of square cross-section, mounted on the torque tube casing 16, is connected by bolts 202 and 203 to the forward downwardly curved ends of the beams 188 and 189. The square tubular beam 201 extends through a square transverse opening 201' in a downward extension at the rear end of the casing 16 and is held in position on the casing 16 by means of diagonal bolts 204 which are screwed into lugs at opposite sides of the torque tube casing 16 as may be seen from Figs. 1 and 2. The transverse opening 201' is sufficiently large to permit ready longitudinal movement of the beam 201 therethrough for purposes of assembly and channel clips 205 on the bolts 204 engage the tubular beam 201 to force it into the opposite corner of the square opening 201' by tightening the bolts 204 as shown in Fig. 2.

Pivotally mounted on the torque tube casing 16, forwardly of the beam 201, by means of a bearing pin 206 is a clutch pedal 207 which is pivotally connected with the rear end of the clutch actuating rod 39 at 208, and a spring 209 between the rod 39 and the clutch pedal 207 tends to hold the clutch pedal in the position in which it is shown in Fig. 2. Also pivoted to the clutch pedal 207 at 208 is a latch 210 which may be swung manually into engagement with the tubular beam 201 when the clutch pedal is depressed and it is desired to lock the clutch pedal in depressed position in order to hold the clutch out of engagement.

The horizontal flanges of the beams 188 and 189 extend in a horizontal plane substantially above the axis of the rear wheels 93 and 94, and the rear wheels extend upwardly beyond said plane, or in other words, the mentioned plane extends horizontally below the tops of the rear wheels, as may be seen from Figs. 1 and 19. Secured to the beams 188 and 189, respectively, are stub fenders 211 and 212 shown in Fig. 19, and the relation of the fender 212 to the mentioned plane as indicated in Fig. 1 is the same as the relation of the fender 211 to said plane. Each fender has a bottom portion which extends along the respective beam 188 or 189 on which it is mounted, from front to rear, and the bottom edge of each fender includes a relatively long straight and horizontal portion extending in the mentioned plane. At the front, the bottom portion of the fender extends approximately to a point laterally of the intersection of the periphery of the respective rear wheel 93 or 94 with the mentioned horizontal plane, and at the rear the bottom portion of the fender extends beyond the periphery of the respective rear wheel as shown in Figs. 1 and 19. A major portion of the fender above its bottom portion is curved away from the vertical plane of the upstanding angle iron flange to which the fender bottom is secured, the curvature being in the direction towards the respective propelling wheel 93 or 94, as clearly shown in Fig. 19. The bolts 195 which secure the seat frame to the beams 188 and 189 also pass through the bottom portions of the fenders, additional bolts 213 being provided to hold the fenders securely in position on the vertical flanges of the beams 188 and 189. Stay clips 214 are welded to the sides of the fenders facing the wheels and extend over the vertical flanges of the beams 188 and 189 as indicated in Figs. 9 and 10.

It will be seen that the beams 188 and 189 and the transverse tubular beam 201 provide a very rigid and substantial framework which is not only strong enough to securely support the operator's seat and the fenders, but which may also be utilized to attach implements to the tractor such as a pushtype cultivator or an underslung plow. A pushtype cultivator attachment, for instance, may be connected at its rear with the tubular beam 201 and at the front with the bell housing of the torque tube casing 16, mounting pads 227 and threaded bolt holes 228 in the mounting pads being provided at opposite sides of the bell housing for securing implement supports thereto. An underslung plow attachment may be connected at its forward end to the tubular member 201 and at a rearward portion to the rear ends of the angle iron beams 188 and 189. Features of the fender and seat equipment herein disclosed are claimed in a copending application of Conrad E. Frudden and Walter F. Strehlow, Serial No. 320,106, filed February 21, 1940, for Tractor rear assembly.

A trailing vehicle or drawn-behind implement, such as a wheeled plow, a harrow, or the like, are preferably hitched to a drawbar 229 shown in Figs. 1 and 19, the drawbar having opposite side arms connected at their forward ends with the inner side walls 99 of the final drive casings of the L-shaped supports at opposite sides of the arched rear axle structure. The drawbar is pivotally adjustable up and down about pivot pins 230, each pivot pin 230 being secured to one end of a latch 231 which has a bolt hole at its other end. The pivot pin secured to the latch 231 extends through a hole in the side arm of the drawbar into the side wall of the respective final drive casing, and a bolt 232 extending through the bolt hole of the latch 231 and through one of a series of holes 232' in the side arm of the drawbar is screwed into the side wall of the respective final drive casing. It will be seen that this construction provides for ready vertical adjustment of the drawbar about the pivot pins 230 and for removal of the drawbar from the tractor, if desired.

A driver operating the tractor may take a position on the seat cushion 187 more or less directly behind the steering wheel 183 and, straddling the rear portion of the torque tube casing 16 with his legs, he may rest his feet on the tubular beam 201. When so seated the driver has a wide range of vision of the ground ahead of him, which not only affords him a good view of the field at some distance ahead of the tractor, but also enables him to focus his eyes on a plant on the ground between the front wheels and to observe such plant while the tractor proceeds until the plant disappears under the cross beam 201 and under the rear axle structure. The plant, in order to be within the driver's range of vision, does not have to stand relatively close to the tread line of one or the other of the front wheels, but it may stand on a ground line extending longitudinally of the tractor centrally between the wheels, such a line being indicated by the dash-dotted line A in Fig. 19. The lower part of the motor block 8 has a transverse width about equal to the diameter of the front end of the bell housing of the torque tube casing 16, as may be seen from Fig. 19, but the motor block is relatively far away from the driver and since it is raised a substantial distance above the ground, due to the arched front axle, the driver may see a plant on line A in Fig. 19 under the motor unit by looking downwardly and forwardly from his seat along one side or the other of the tractor body forwardly of the rear axle structure. When looking down along the left side of the tractor between the torque tube casing 16 and the drive wheel 93 which is laterally offset therefrom towards the left, the driver's vision is somewhat obstructed by the steering arm 188 and the reach rod 182, but the driver may nevertheless see a plant on line A in Fig. 19 below the motor unit, by looking down along the left side of the tractor. Preferably, however, he will look down along the right side of the tractor between the torque tube casing 16 and the drive wheel 94 which is laterally offset therefrom towards the right, and which side of the tractor is free from lateral projections which might obstruct the driver's vision of plants on line A below the engine unit and the torque tube casing. Looking down either at the right or at the left side of the tractor body the driver is not compelled to lean over uncomfortably on his seat to the right or left in order to see a plant on line A in Fig. 19 under the motor unit or torque tube casing.

Depending on whether the driver wishes to look down along the right side or the left side of the tractor, and on the desired range of forward vision under the tractor, the driver may move more or less towards one end or the other of the seat 187. From a central position on the seat, in which the driver is located in line with the tubular member of the torque tube casing 16, the driver may slide up close to the fender 211 and thereby place himself into a laterally offset position, to the left, relative to the tubular member of the torque tube casing, or he may slide up close to the fender 212 and thereby place himself into a laterally offset position, to the right, relative to the tubular member of the torque tube casing 16. As the tractor advances the driver may keep his eyes on the mentioned plant for a certain length of time until the plant stands about directly under his feet. All plants on line A in Fig. 19 from a plant standing about directly under the front axle, up to a plant standing about directly under the driver's feet will be conveniently visible to the driver looking down along the left or right side of the tractor body forwardly of the rear axle structure, this convenient visibility being due primarily to the long narrow tubular portion of the torque tube casing 16 rearwardly of the bell housing of the torque tube casing and forwardly of the transmission and differential casing 43. The rearwardly tapering fuel tank 159 and the transversely narrow sheet metal support 169 for the fuel tank also contribute to a wide range of visibility.

Referring to Figs. 1, 12 and 19, it will be noted that the height of the ground clearance afforded by the upwardly arched front axle 3 at the front end of the tractor is substantially the same as the height of the ground clearance afforded by the upwardly arched rear axle structure at the rear end of the tractor, and that a relatively high and wide space is available for plants standing on line A in Fig. 19. The dash-dotted lines B and C in Fig. 19 indicate plant rows at opposite sides of and parallel to a plant row on line A, and the relation of the tractor to the three plant rows indicated in Fig. 19 is that corresponding to a one-row use of the tractor. When the tractor is used for one-row work as indicated in Fig. 19, the front and rear wheels straddle a single plant row, the front and rear wheels at the left side of the tractor running approximately in the middle between two relatively adjacent plant rows A and B, and the front and rear wheels at the right side of the tractor running approximately in the middle between relatively adjacent plant rows A and C, plant row A extending longitudinally of the tractor centrally between the rear wheels and centrally between the front wheels.

Referring to Fig. 9 the wheel body 119, which has already been mentioned, forms part of the left propelling wheel 93 which also includes a tire rim 215 and a pneumatic tire 216. The tire rim 215 has an annular inwardly projecting ridge portion 217 which is engaged at diagonally opposed points by rim clamps 218 and 219 as shown in Fig. 9. The ridge 217 has a V-shaped cross-section, and the rim clamps 218, 219 each have a peripheral groove 217' which is also V-shaped to fit the ridge 217 as indicated in Fig. 9. Another pair of diagonally opposed rim clamps 218' and 219', which are duplicates of the rim clamps 218 and 219, respectively, engage the ridge 217 on a diameter at right angles to the diameter of the first pair of rim clamps 218 and 219, as indicated in Fig. 1. The rim clamp 218 as shown in Fig. 9 is secured to the wheel body 119 by means of a bolt 220 which has an eccentric shoulder 221 engaging a bore in the rim clamp 218. A nut 222 and a lockwasher 223 on the bolt 220 are drawn up against the wheel body so as to pull the rim clamps 218 tightly against the wheel body and prevent it from displacement relative thereto about the eccentric portion 221. The rim clamp 219 shown at the bottom of Fig. 9 is secured to the wheel body 119 by an ordinary bolt 224 having a straight cylindrical shank and a nut 225 and lockwasher 226, the nut and lockwasher being likewise tightened up against the wheel body so as to hold the rim clamp 219 securely against displacement relative to the wheel body 119.

Referring to Fig. 1, it will be seen that the plain bolts 224 are spaced ninety degrees apart and it is to be understood that the bolts 220 with the eccentric shoulders are likewise spaced ninety degrees from each other and are spaced ninety degrees from the bolts 224. A pair of peripherally spaced lugs 233 are secured to the rim 215, preferably by welding, the peripheral spacing of the lugs 233 being such that one of the rim clamps may be received therebetween as shown for the rim clamp 219 in Fig. 1. The lugs 233 cooperate with the rim clamp 219 to prevent rotary displacement of the rim 215 relative to the wheel body 119 when the wheel body is rotated by the power of the motor. A cutout 234 in the wheel body 119 for the reception of the tire valve 235 is spaced 45 degrees from the centers of the adjacent bolts 220 and 224.

In order to remove the tire rim 215 from the wheel body 119 the nuts 222 of the eccentric bolts 220 are loosened and the bolts may then be turned to move the rim clamps 218 and 218' radially in a direction away from the ridge portion 217 of the tire rim. The bolts 220 may then be readily withdrawn from the wheel body 119 and the wheel rim may be removed from the wheel body. On the other hand, when the tire rim 215 is to be mounted on the wheel body 119 the rim clamps 219 and 219' are first mounted on the wheel body by means of the bolts 224 and the wheel rim is arranged in a position so as to place the ridge portion 217 of the tire rim into the V-shaped peripheral grooves of the rim clamps 219 and 219'. The bolts 220, with the rim clamps 218 and 218' positioned on the eccentric shoulders thereof, are then inserted through their respective holes in the wheel body 119 and turned by means of a wrench fitting the heads of the bolts 220, to move the rim clamps 218 radially outwardly of the wheel body, which movement, although only of small magnitude, will cause the wheel rim to be tightly gripped by the rim clamps 218 and 218', the rim clamps 219 and 219' affording proper abutments against which the tire rim 215 is drawn up during radial outward movement of the rim clamps 218. After the rim clamps have been tightened by radial outward movement, the nuts 222 are drawn up to secure the parts in permanently fixed position relative to each other. Each of the bolts 220 with its eccentric shoulder 221, together with the respective clamp 218 constitutes a toggle mechanism between the wheel body 119 and the rim 215, and this toggle mechanism is in dead center relation or approximately so when the bolts 220 have been turned to force the rim clamps 218 and 218' into engagement with the ridge 217. This dead center relation will not easily be broken because the clamps 218 and 218' engage the rim on surfaces of substantial length peripherally of the rim, and there is enough friction in this toggle mechanism to hold it in dead center relation or approximately so even while the nuts 222 are loose. It is therefore not necessary to hold the bolts 220 with a wrench against rotation after they have been turned to force the clamps 218 into engagement with the ridge 217, and this feature facilitates assembly of the wheel body and rim. Features of the detachable rim mounting herein disclosed are claimed in a copending application of Conrad E. Frudden, Serial No. 355,736, filed September 7, 1940, for Vehicle wheel.

Referring to Figs. 20 to 23, it will be noted that the rim mounting as described hereinbefore in connection with Figs. 1 and 9 affords a convenient arrangement for varying the axial spacing of the propelling wheels from each other. The relative position of the tire rim 215 and wheel body 119 illustrated in Fig. 20 corresponds to that shown in Fig. 9. By reversing the position of the tire rim on the rim clamps 218 and 219 the positioning of the tire relative to the wheel body 119 as shown in Fig. 21 may be obtained. Fig. 22 shows the rim clamp 218 moved from the inner side of the wheel body 119 to the outer side and in this type of mounting all of the rim clamps are, of course, secured to the outer side of the wheel body 119, the tire rim being positioned to extend, with its larger portion, inwardly over the wheel body 119. In Fig. 23 the rim clamps are secured to the wheel body 119 in the same position as described in connection with Fig. 22, but the position of the tire rim on the rim clamps is reversed relative to the position in which the tire rim is shown in Fig. 22.

The axial spacing of the rims of the propelling wheels 93 and 94 shown in Fig. 19 is such that the center between the side edges of the rim 215 of the left propelling wheel and the center between the side edges of the rim 215 of the right propelling wheel are spaced a distance substantially equal to the spacing between two adjacent plant rows, the plant row B being spaced from the plant row A the same distance as the plant row C. The mounting of the rear wheels described hereinbefore permits positioning of the rims at four different axial spacings from each other, these spacings being preferably 40, 44, 48 and 52 inches measured from the center between the side edges of one rim to the center between the side edges of the other rim. By changing the axial spacing of the rims the tread width of the propelling wheels may therefore be adjusted to accommodate different row spacings. In order to obtain the narrowest tread width the rims 215 of the propelling wheels 93 and 94 are each mounted in a position inwardly of the wheel body 119 as indicated by Figs. 9 and 20. The next wider tread width is obtained by removing the rim clamps of each propelling wheel from the inner side of the wheel body 119 and securing them to the outer side, and by positioning the rims 215 inwardly of the wheel bodies in accordance with Fig. 22. The third tread width is obtained by securing the rim clamps of each propelling wheel inwardly of the wheel body 119 and by positioning the rims 215 outwardly of the wheel bodies in accordance with Fig. 21, the position of the rim 215 shown in Fig. 21 being obtained by reversing the rim from the position in which it is shown in Fig. 20. The fourth or widest tread width of the propelling wheels is obtained by securing the rim clamps 218 of each propelling wheel to the outer side of each wheel body 119 and by positioning the rims 215 outwardly of the wheel bodies in accordance with Fig. 23, the position of the rim 215 shown in Fig. 23 corresponding to a reversal of the rim 215 in Fig. 22.

Another arrangement of the tire rims would be obtained by mounting the tire rim of the left propelling wheel in the position indicated in Fig. 20, and by mounting the tire rim of the right propelling wheel in the position indicated by Fig. 23. As a result of such an arrangement, if used at front and rear, the center of the tractor body would be offset towards the left from a central vertical plane between the tires of the propelling wheels and a plant row centrally between the propelling wheels would therefore extend on a line offset towards the right of the torque tube casing 16. Similarly, a plant row centrally between the tires of the propelling wheels 93 and 94 may be offset towards the left of the tubular torque tube casing by mounting the rim of the left propelling wheel in the position indicated by Fig. 23, and by mounting the rim of the right propelling wheel in the position indicated by Fig. 20.

In order to change the tread width of the front wheels an arrangement similar to that explained hereinbefore in connection with the rear wheels may be used, or any other arrangement for offsetting the wheels, for instance, an extensible axle structure or a mounting permitting reversal of the entire front wheels may be employed.

While in the foregoing a preferred embodiment of the invention has been shown and described, it should be understood that it is not intended to limit the invention to the details of construction herein shown and described, for various modifications within the scope of the claims may occur to persons skilled in the art.

It is claimed and desired to secure by Letters Patent:

1. In a tractor, a transmission housing, a transmission shaft journaled in said housing in angularly fixed relation thereto, a universal joint having a first element secured to said transmission shaft and a second element connected with said first element for rotation therewith about the axis of said transmission shaft and for substantial movement angularly thereof, a propeller shaft secured to said second joint element, a tubular member surrounding said propeller shaft, and disconnectable fastening means rigidly securing said tubular member to said transmission housing, said tubular member and propeller shaft being telescopically separable from each other upon disconnection of said fastening means.

2. In a tractor, a transmission housing, a transmission shaft journaled in said housing in angularly fixed relation thereto, a universal joint having a first element secured to said transmission shaft and a second element connected with said first element for rotation therewith about the axis of said transmission shaft and for substantial movement angularly thereof, a propeller shaft secured to said second joint element, a tubular member surrounding said propeller shaft, disconnectable fastening means rigidly securing said tubular member to said transmission housing, and supporting means secured to said tubular member adapted to hold said propeller shaft in a position of substantial alinement with said transmission shaft, said propeller shaft being telescopically separable from said tubular member and supporting means, to permit simultaneous removal of said transmission housing and propeller shaft from said tubular member upon disconnection of said fastening means.

3. In a tractor, an engine having a power shaft, a propeller shaft adapted to be driven by said power shaft and having one end thereof piloted on said power shaft, a support detachably secured to said engine, a driven shaft rotatably mounted on said support in angularly fixed relation thereto, and a gimbal joint connecting said propeller shaft at its other end with said driven shaft.

4. In a tractor, an engine having a housing and a power shaft rotatably mounted in said housing in angularly fixed relation thereto, a second housing spaced from said engine housing axially of said power shaft, an elongated hollow reach member detachably connected at one end to said engine housing and secured at its other end to said second housing, a driven shaft journaled in said second housing for rotation about an axis in substantial alinement with the axis of said power shaft, and means including a propeller shaft within said reach member adapted to transmit rotation of said power shaft to said driven shaft, said propeller shaft having an axially separable supporting connection with said power shaft adjacent to said engine housing, and a supporting and universal driving connection with said driven shaft adjacent to said second housing.

5. In a tractor, an engine having a housing and a power shaft rotatably mounted in said housing in angularly fixed relation thereto, a second housing spaced from said engine housing axially of said power shaft, an elongated hollow reach member detachably connected at opposite ends thereof to said engine housing and second housing, respectively, a driven shaft journaled in said second housing for rotation about an axis in substantial alinement with said power shaft, and means adapted to transmit rotation of said power shaft to said driven shaft, comprising a driving clutch element within said reach member adjacent to said engine housing secured to said power shaft, a driven clutch element cooperating with said driving clutch element, a propeller shaft extending through said driven clutch element piloted on said power shaft and axially separable from said power shaft and driven clutch element, and a universal joint within said reach member adjacent to said second housing having driving and driven members respectively secured to said propeller shaft and said driven shaft.

6. In a tractor, an engine having a housing and a power shaft rotatably mounted therein in angularly fixed relation thereto, a second housing and a driven shaft rotatably mounted in said second housing in angularly fixed relation thereto, means adapted to retain said housings in fixed relation to each other affording substantial alinement of said power and driven shafts, means including a propeller shaft adapted to transmit rotation of said power shaft to said driven shaft, said propeller shaft having an axially separable supporting connection with said power shaft and a supporting and universal driving connection with said driven shaft, and means including a supporting member connected with said second housing, adapted to retain said propeller shaft in approximate axial alinement with said driven shaft upon separation of said supporting connection between said power and propeller shafts.

7. In a tractor, an engine having a housing and a power shaft rotatably mounted in said housing in angularly fixed relation thereto, a second housing spaced from said engine housing axially of said power shaft, an elongated hollow reach member detachably connected at one end to said engine housing and detachably connected at its other end to said second housing, a driven shaft journaled in said second housing for rotation about an axis in substantial alinement with the axis of said power shaft, means including a propeller shaft within said reach member adapted to transmit rotation of said power shaft to said driven shaft, said propeller shaft having an axially separable supporting connection with said power shaft at one end of said reach member and a supporting and universal driving connection with said driven shaft at the other end of said reach member, and a sleeve member secured to said reach member surrounding an intermediate portion of said propeller shaft, the interior surface of said sleeve member being spaced from said propeller shaft, whereby said propeller shaft will be retained in approximate axial alinement with said driven shaft upon separation of said supporting connection between said power and propeller shafts.

8. In a tractor, a propelling wheel, a hollow support and a cover therefor cooperating to form an enclosure laterally of said wheel and separable from each other transversely of the axis of said wheel, a gear within said enclosure coaxial with said wheel, and means non-rotatably connecting said wheel and gear including an axle element rotatably mounted on said support, and a detachable connection between said gear and axle element, the aperture of said support closed by said cover being dimensioned and positioned to permit removal of said gear therethrough after removal of said cover and detachment of said axle element from said gear.

9. In a tractor, a propelling wheel, a hollow support and a pan having relatively abutting edge portions spaced radially from the axis of said wheel, said support and pan cooperating to form an enclosure laterally of said wheel, a gear within said enclosure coaxial with said wheel projecting into said pan, and means non-rotatably connecting said wheel and gear including an axle element rotatably mounted on said support, and a detachable connection between said gear and axle element, the aperture of said support closed by said pan being dimensioned and positioned to permit removal of said gear therethrough after removal of said pan and detachment of said axle element from said gear.

10. In a tractor, a propelling wheel, a gear wheel coaxial with and laterally spaced from said propelling wheel, a hollow support having a side wall in the space between said propelling and gear wheels, another side wall, at the opposite side of said gear wheel, and end walls between said side walls, said support having an oblong bottom opening, between said side and end walls, extending longitudinally in the direction of the plane of said gear wheel, means non-rotatably connecting said wheels including an axle element rotatably mounted on said support in proximity to said bottom opening thereof so as to leave a substantial portion of said gear wheel below its axis uncovered by said support, and a pan detachably secured to said support in position to cover said uncovered portion of said gear wheel.

11. In a tractor, a propelling wheel; a gear wheel coaxial with and laterally spaced from said propelling wheel; a casing having a side wall in the space between said wheels, another side wall at the opposite side of said gear wheel, end walls connecting said side walls, and an oblong aperture between said side and end walls extending longitudinally in the direction of the plane of said gear wheel and permitting movement of said gear wheel therethrough; a hollow supporting arm radially offset from the axis of said wheels, integrally formed with said casing; means non-rotatably connecting said wheels including an axle element journaled in said casing and detachably connected with said gear wheel to permit withdrawal of said gear wheel from said casing through said aperture upon detachment from said axle element, and drive means for said gear wheel including a drive shaft extending longitudinally within said supporting arm, said side wall of said casing between said propelling and gear wheels having an aperture in line with said drive shaft permitting axial movement of said drive shaft therethrough.

12. In a tractor having an upwardly arched axle structure supported on propelling wheels, a housing forming an intermediate upper portion of said axle structure, supports for said wheels at opposite sides of said housing each comprising a transverse hollow arm detachably secured at one end to said housing, and a depending casing portion integrally formed with said arm at the other end thereof; and drive mechanism for said wheels within said housing, arms and casing portions including final drive gears coaxial with said wheels, each of said casing portions having opposite side walls and an oblong opening therebetween permitting movement of the respective final drive gear therethrough transversely of its axis of rotation.

13. In a tractor having an upwardly arched axle structure supported on propelling wheels, a housing forming an intermediate upper portion of said axle structure, supports for said wheels at opposite sides of said housing each comprising a transverse hollow arm detachably secured at one end to said housing, and a depending casing portion integrally formed with said arm at the other end thereof; and drive mechanism for said wheels including transverse drive shafts within said arms, and final drive gears within said casing portions coaxial, respectively, with said propelling wheels, each of said arms having an end opening, remote from said housing, permitting axial movement of the respective drive shaft therethrough, and each of said casing portions having opposite side walls and an oblong opening therebetween permitting movement of the respective final drive gear therethrough transversely of its axis of rotation.

14. In a tractor having a pair of axially spaced propelling wheels and a portion of its body arranged therebetween, the combination of supporting and driving means for said wheels comprising, at each side of said body portion, an angular support having a transverse arm detachably secured, at its inner end, to said body portion, and an end portion integrally formed with and depending from said arm at the outer end thereof; an axle element secured to the propelling wheel at the respective side of said body portion, extending through and journaled in an aperture of said depending end portion; means releasably securing said axle element against axial displacement relative to said support; final drive mechanism including a gear at the side of said depending end portion opposite to said propelling wheel; and means non-rotatably securing said gear coaxially to said axle element, permitting axial separation of said axle element from said gear.

15. In a tractor having a pair of axially spaced propelling wheels and a portion of its body arranged therebetween, the combination of supporting and driving means for said wheels comprising, at each side of said body portion, an angular support having a transverse arm detachably secured, at its inner end, to said body portion, and an end portion integrally formed with and depending from said arm at the outer end thereof; an axle element secured to the propelling wheel at the respective side of said body portion, extending through and journaled in an aperture of said depending end portion; means releasably securing said axle element against axial displacement relative to said support; a drive shaft extending longitudinally of said arm, journaled on said support; means at said outer end of said arm cooperating with said support and drive shaft to releasably secure the latter against axial displacement outwardly of said arm; final drive mechanism operatively connected with said drive shaft including a gear at the side of said depending end portion opposite to said propelling wheel; and means non-rotatably securing said gear coaxially to said axle element, permitting axial separation of said axle element from said gear.

16. In a tractor having a pair of axially spaced propelling wheels and a portion of its body arranged therebetween, the combination of supporting and driving means for said wheels comprising, at each side of said body portion, an angular support having a transverse arm detachably secured, at its inner end, to said body portion, and relatively opposed end portions integrally formed with and depending from said arm at the outer end thereof inwardly of the respective propelling wheel; final drive mechanism including a gear between said end portions having a central bore coaxial with said propelling wheel, an axle shaft connected with said propelling wheel and extending through said bore and through an aperture in the end portion between said gear and wheel, and means securing said axle shaft rotatably to said end portions and non-rotatably to said gear, said last named means being releasable to permit axial withdrawal of said axle shaft from said end portions and from said gear.

17. In a tractor having a pair of axially spaced propelling wheels and a portion of its body arranged therebetween, the combination of supporting and driving means for said wheels comprising, at each side of said body portion, an angular support having a vertical casing section at the inner side of the respective propelling wheel and a transverse hollow arm integrally formed with said casing section and detachably secured, at its end remote from said casing section, to said body portion, a drive shaft journaled in openings of opposite side walls of said casing section and extending through said arm into said body portion, means detachably securing said drive shaft against axial displacement relative to said support and permitting axial withdrawal of said drive shaft from said arm and casing section, final drive mechanism operatively connected with said drive shaft including a gear within said casing section having a central bore coaxial with said propelling wheel, an axle shaft connected with said propelling wheel and extending through said bore and through a lower aperture of the side wall of said casing section between said gear and propelling wheel, and means securing said axle shaft rotatably to said casing section at opposite sides of said gear and non-rotatably to said gear, said last named means being releasable to permit axial withdrawal of said axle shaft from said casing section and from said gear.

18. In a frameless type tractor, the combination of a forward engine unit, a torque tube casing having a circumferential wall portion forming a rearwardly tapering bell housing and a relatively long rearward tubular extension of the reduced end of said bell housing, means supportingly connecting said torque tube casing at the forward end of said bell housing with the rear of said engine unit, a gear casing secured to said torque tube casing at the rear end of said tubular extension, running gear including a propelling wheel supportingly connected with said gear casing in laterally offset relation to said tubular extension of said bell housing, and means for transmitting power from said engine to said propelling wheel, said means including clutch mechanism operatively connected with said engine and enclosed within said bell housing, a propeller shaft drivingly connected with said clutch mechanism and extending longitudinally through said tubular extension of said bell housing, and selective change speed mechanism drivingly connected with said propeller shaft and enclosed within said gear casing.

19. In a tractor, a forward engine unit, a torque tube casing having a circumferential wall portion forming a rearwardly tapering bell housing and a relatively long and narrow tubular extension of the reduced end of said bell housing, forward fastening means cooperating with a forward portion of said bell housing and with said engine unit to rigidly secure said torque tube casing to said engine unit, a rear support including an upwardly arched axle structure and rear wheels at opposite ends thereof, affording vertical clearance, at the rear of the tractor, for a plant row extending parallel to said rear wheels centrally therebetween, rearward fastening means cooperating with a portion of said torque tube casing at the rear end of said tubular extension and with a portion of said axle structure between said rear wheels to rigidly secure said tubular extension of said torque tube casing to said axle structure in laterally spaced relation to at least one of said rear wheels, said engine unit and rear support being retained in fixed position relative to each other solely by said torque tube casing and by said forward and rearward fastening means, front supporting means for said engine unit cooperating with the latter and the ground to afford substantially the same vertical clearance for said plant row, at the front of the tractor, as afforded by said rear support, and means for transmitting propelling power from said engine unit to said rear wheels, including a propeller shaft extending longitudinally within said tubular extension of said bell housing, whereby an operator at the rear of the tractor looking down between said tubular extension and said one rear wheel may conveniently see a substantial length of said plant row forwardly of said rear wheels.

20. In a tractor, a forward engine unit, a torque tube casing in rear of said engine unit having a circumferential wall portion forming a tubular member of substantial length longitudinally of the tractor and of relatively short width transversely of the tractor, forward fastening means cooperating with a forward portion of said torque tube casing and with said engine unit to rigidly secure said torque tube casing to said engine unit, means supporting said engine unit and torque tube casing above the ground including a propelling wheel laterally offset from said torque tube casing, a support for said propelling wheel in rear of said torque tube casing, and rearward fastening means cooperating with a portion of said torque tube casing at the rear end of said tubular member and with said support to rigidly secure said torque tube casing to said support; and means drivingly connecting said engine unit with said propelling wheel including clutch mechanism adjacent to said engine unit, selective change speed mechanism adjacent to said support, and a propeller shaft extending longitudinally within said tubular member of said torque tube casing for transmitting power from said clutch mechanism to said change speed mechanism; said engine unit and support being retained in fixed position relative to each other solely by said torque tube casing and by said forward and rearward fastening means, and said tubular member being of such reduced width with respect to said engine unit and of such length that an operator at the rear of the tractor looking down at the side thereof next to said propelling wheel may conveniently see a ground area of substantial length longitudinally of the tractor directly below the axis of said torque tube casing.

21. In a tractor, a forward engine unit, a torque tube casing having a forward portion forming a clutch housing in rear of said engine unit and a circumferential wall portion forming a tubular member, in rear of said clutch housing, of substantial length longitudinally of the tractor and of relatively short width transversely of the tractor, forward fastening means cooperating with said clutch housing and with said engine unit to rigidly secure said torque tube casing to said engine unit, a gear casing in rear of said torque tube casing, rearward fastening means cooperating with a portion of said torque tube casing at the rear end of said tubular member and with said gear casing to rigidly secure said torque tube casing to said gear casing, running gear adapted to sustain said engine unit, torque tube casing and gear casing above the ground including a propelling wheel supportingly connected with said gear casing on a transverse axis below the level of said torque tube casing and rotatable in a plane laterally spaced from said tubular member thereof, and means drivingly connecting said engine unit with said propelling wheel including clutch mechanism within said clutch housing, selective change speed mechanism within said gear casing, and a propeller shaft extending longitudinally within said tubular member for transmitting power from said clutch mechanism to said change speed mechanism; said engine unit and gear casing being retained in fixed position relative to each other solely by said torque tube casing and by said forward and rearward fastening means, and said tubular member being of such reduced width with respect to said clutch housing and of such length that an operator at the rear of the tractor looking down at the side thereof next to said propelling wheel may conveniently see a ground area of substantial length and width directly below said torque tube casing.

22. In a tractor, a forward engine unit, a torque tube casing in rear of said engine unit having a circumferential wall portion forming a tubular member of substantial length longitudinally of the tractor and of relatively short width transversely of the tractor, forward fastening means cooperating with a forward portion of said torque tube casing and with said engine unit to rigidly secure said torque tube casing to said engine unit, a rear support including an upwardly arched axle structure and rear wheels at opposite ends thereof, affording vertical clearance, at the rear of the tractor, for a plant row extending parallel to said rear wheels centrally therebetween, rearward fastening means cooperating with a portion of said torque tube casing at the rear end of said tubular member and with a portion of said axle structure between said rear wheels to rigidly secure said tubular member of said torque tube casing to said axle structure in laterally spaced relation to at least one of said rear wheels, said engine unit and rear support being retained in fixed position relative to each other solely by said torque tube casing and by said forward and rearward fastening means, front supporting means for said engine unit cooperating with the latter and with the ground to afford substantially the same vertical clearance for said plant row, at the front of the tractor, as afforded by said rear support, and means for transmitting propelling power from said engine unit to said rear wheels including clutch mechanism adjacent to said engine unit, selective change speed mechanism adjacent to said rear support, and a propeller shaft extending longitudinally within said tubular member for connecting said clutch mechanism with said change speed mechanism; said tubular member being of such reduced width with respect to said engine unit and of such length that an operator at the rear of the tractor looking down between said tubular member and said one rear wheel may conveniently see a substantial length of said plant row forwardly of said rear wheels.

23. A tractor comprising an engine unit, front wheels steerably mounted on opposite ends of an upwardly arched front axle having an upper transverse portion supportingly connected with said engine unit, a pair of rear wheels axially spaced from each other substantially the same distance as said front wheels, an arched rear axle structure supported by and extending upwardly between said rear wheels, a torque tube casing extending between said engine unit and an upper transverse portion of said rear axle structure and having an elongated narrow tubular portion intermediate its ends of substantially reduced transverse width with respect to said engine unit and of a height approximately equal to its width, forward fastening means cooperating with a forward portion of said torque tube casing and with said engine unit, and rearward fastening means cooperating with a rearward portion of said torque tube casing and with said upper transverse portion of said rear axle structure to secure said torque tube casing to said engine unit and to said rear axle structure, respectively; said engine unit and rear axle structure being retained in fixed position relative to each other solely by said torque tube casing and by said forward and rearward fastening means; and power transmitting means drivingly connecting said engine unit with said rear wheels, said power transmitting means including a propeller shaft extending through said tubular portion of said torque tube casing, and selective change speed mechanism in rear of said tubular portion of said torque tube casing operatively connected with said propeller shaft.

24. A tractor as set forth in claim 23, in which a steering column operatively connected with said front wheels is mounted on a forward portion of said torque tube casing and carries a hand wheel rearwardly of said tubular portion of said torque tube casing.

25. In a tractor, a forward engine unit, a torque tube casing in rear of said engine unit having a circumferential wall portion forming a tubular member of substantial length longitudinally of the tractor and of relatively short width transversely of the tractor, forward fastening means cooperating with a forward portion of said torque tube casing and with said engine unit to rigidly secure said torque tube casing to said engine unit, means supporting said engine unit and torque tube casing above the ground including a propelling wheel laterally offset from said torque tube casing, a support for said propelling wheel in rear of said torque tube casing, and rearward fastening means cooperating with a portion of said torque tube casing at the rear end of said tubular member and with said support to rigidly secure said torque tube casing to said support; means drivingly connecting said engine unit with said propelling wheel including clutch mechanism adjacent to said engine unit, selective change speed mechanism adjacent to said support, and a propeller shaft extending longitudinally within said tubular member of said torque tube casing for transmitting power from said clutch mechanism to said change speed mechanism; said engine unit and support being retained in fixed position relative to each other solely by said torque tube casing and by said forward and rearward fastening means; and an operator's seat adjacent to said support having a seating surface between the plane of said propelling wheel and a vertical plane through the axis of said tubular member, said tubular member being of such reduced width with respect to said engine unit and of such length that an operator occupying a normal sitting position on said seat, laterally offset with respect to said tubular member towards said propelling wheel, may observe a ground area of substantial length longitudinally of the tractor directly below the axis of said tubular member.

26. In a tractor, a forward engine unit, a torque tube casing in rear of said engine unit having a circumferential wall portion forming a tubular member of substantial length longitudinally of the tractor and of relatively short width transversely of the tractor, forward fastening means cooperating with a forward portion of said torque tube casing and with said engine unit to rigidly secure said torque tube casing to said engine unit, a rear support including an upwardly arched axle structure and rear wheels at opposite ends thereof, affording vertical clearance, at the rear of the tractor, for a plant row extending parallel to said rear wheels centrally therebetween, rearward fastening means cooperating with a portion of said torque tube casing at the rear end of said tubular member and with a portion of said rear axle structure between said rear wheels to rigidly secure said tubular member of said torque tube casing to said axle structure in laterally spaced relation to at least one of said rear wheels, said engine unit and rear support being retained in fixed position relative to each other solely by said torque tube casing and by said forward and rearward fastening means, front supporting means for said engine unit cooperating with the latter and with the ground to afford substantially the same vertical clearance for said plant row at the front of the tractor, as afforded by said rear support, means for transmitting propelling power from said engine unit to said rear wheels including clutch mechanism adjacent to said engine unit, selective change speed mechanism adjacent to said rear support, and a propeller shaft extending longitudinally within said tubular member for connecting said clutch mechanism with said change speed mechanism; and an operator's seat adjacent to said rear support, having a seating surface between the plane of said one rear wheel and a vertical plane through the axis of said tubular member, said tubular member being of such reduced width with respect to said engine unit and of such length that an operator occupying a normal sitting position on said seat, laterally offset with respect to said tubular member towards said one rear wheel, may observe a ground area of substantial length longitudinally of the tractor directly below the axis of said tubular member.

27. In a tractor, a forward engine unit, a torque tube casing in rear of said engine unit having a circumferential wall portion forming a tubular member of substantial length longitudinally of the tractor and of relatively short width transversely of the tractor, forward fastening means cooperating with a forward portion of said torque tube casing and with said engine unit to rigidly secure said torque tube casing to said engine unit, a rear support including an upwardly arched axle structure and rear wheels at opposite ends thereof, affording vertical clearance, at the rear of the tractor, for a plant row extending parallel to said rear wheels centrally therebetween, rearward fastening means cooperating with a portion of said torque tube casing at the rear end of said tubular member and with a portion of said rear axle structure between said rear wheels to rigidly secure said tubular member of said torque tube casing to said axle structure in laterally spaced relation to each of said rear wheels and centrally therebetween, said engine unit and rear support being retained in fixed position relative to each other solely by said torque tube casing and by said forward and rearward fastening means, front supporting means for said engine unit cooperating with the latter and with the ground to afford substantially the same vertical clearance for said plant row at the front of the tractor, as afforded by said rear support, means for transmitting propelling power from said engine unit to said rear wheels including clutch mechanism adjacent to said engine unit, selective change speed mechanism adjacent to said rear support, and a propeller shaft extending longitudinally within said tubular member for connecting said clutch mechanism with said change speed mechanism; and an operator's seat at the rear of said tubular member having a seating surface on a level above said tubular member and in the space between the planes of said rear wheels, said seating surface being of such extended width transversely of the tractor that an operator may optionally place himself thereon in a position in line with said tubular member or in a position laterally offset with respect to said tubular member towards one of said rear wheels, and said tubular member being of such reduced width with respect to said engine unit and of such length that the operator may observe, from either of said positions on said seat, a substantial length of said plant row between said rear support and said front supporting means.

28. In a tractor, a forward engine unit, a torque tube casing in rear of said engine unit having a circumferential wall portion forming a tubular member of substantial length longitudinally of the tractor and of relatively short width transversely of the tractor, forward fastening means cooperating with a forward portion of said torque tube casing and with said engine unit to rigidly secure said torque tube casing to said engine unit, a rear support including an upwardly arched axle structure and rear wheels at opposite ends thereof, affording vertical clearance, at the rear of the tractor, for a plant row extending parallel to said rear wheels centrally therebetween, rearward fastening means cooperating with a portion of said torque tube casing at the rear end of said tubular member and with a portion of said rear axle structure between said rear wheels to rigidly secure said tubular member of said torque tube casing to said axle structure in laterally spaced relation to each of said rear wheels and centrally therebetween, said engine unit and rear support being retained in fixed position relative to each other solely by said torque tube casing and by said forward and rearward fastening means, front supporting means for said engine unit cooperating with the latter and with the ground to afford substantially the same vertical clearance for said plant row at the front of the tractor, as afforded by said rear support, means for transmitting propelling power from said engine unit to said rear wheels including clutch mechanism adjacent to said engine unit, selective change speed mechanism adjacent to said rear support, and a propeller shaft extending longitudinally within said tubular member for connecting said clutch mechanism with said change speed mechanism; a pair of fenders for said rear wheels having wall portions at the inner sides, respectively, of the latter, and an operator's seat between said fenders having opposite side edges closely adjacent to said wall portions thereof, the distance between said fenders and the width of said seat being sufficiently great that an operator may optionally occupy a normal sitting position in line with said tubular member or one laterally offset from said tubular member towards either of said fenders, and said tubular member being of such reduced width with respect to said engine unit and of such length that the operator may observe, from any of said positions on said seat, a substantial length of said plant row between said rear support and said front supporting means.

29. A one-row tractor comprising an engine unit, front wheels steerably mounted on opposite ends of an upwardly arched front axle having an upper transverse portion supportingly connected with said engine unit, a pair of rear wheels axially spaced from each other substantially the same distance as said front wheels, an arched rear axle structure supported by and extending upwardly between said rear wheels, a torque tube casing extending between said engine unit and an upper transverse portion of said rear axle structure and having an elongated narrow tubular portion intermediate its ends in laterally spaced relation to at least one of said rear wheels, forward fastening means cooperating with a forward portion of said torque tube casing and with said engine unit, and rearward fastening means cooperating with a rearward portion of said torque tube casing and with said upper transverse portion of said rear axle structure to secure said torque tube casing to said engine unit and to said rear axle structure, respectively; said engine unit and rear axle structure being retained in fixed position relative to each other solely by said torque tube casing and by said forward and rearward fastening means; power transmitting means drivingly connecting said engine unit with said rear wheels, said power transmitting means including a propeller shaft extending through said tubular portion of said torque tube casing, and selective change speed mechanism in rear of said tubular portion of said torque tube casing operatively connected with said propeller shaft; and an operator's seat adjacent to said rear axle structure, having a seating surface between the plane of said one rear wheel and a vertical plane through the axis of said tubular portion of said torque tube casing, said tubular portion being of such reduced width with respect to said engine unit and of such length that an operator occupying a normal sitting position on said seat, laterally offset with respect to said tubular portion towards said one rear wheel, may observe a ground area of substantial length longitudinally of the tractor directly below said axis of said tubular portion.

CONRAD E. FRUDDEN.
WALTER F. STREHLOW.